United States Patent
Shigemoto

Patent Number: 5,383,188
Date of Patent: Jan. 17, 1995

[54] RECEIVER HAVING CLOCK PHASE MEMORY FOR RECEIVING SHORT PREAMBLE TIME SLOTS

[75] Inventor: Naoto Shigemoto, Tokyo, Japan

[73] Assignee: NEC Corporation, Tokyo, Japan

[21] Appl. No.: 138,006

[22] Filed: Oct. 19, 1993

[30] Foreign Application Priority Data

Oct. 19, 1992 [JP] Japan ................................ 4-279730

[51] Int. Cl.$^6$ .................................................... H04J 3/06
[52] U.S. Cl. .............................. 370/105.2; 370/105.3; 370/100.1; 371/5.4; 375/108; 375/111
[58] Field of Search ............... 370/100.1, 105.2, 105.3; 375/106, 108, 111, 118; 371/5.4

[56] References Cited

U.S. PATENT DOCUMENTS

| | | | |
|---|---|---|---|
| 4,404,680 | 9/1983 | Perkins | 375/111 |
| 4,975,929 | 12/1990 | Apple et al. | 370/105.3 |
| 5,123,013 | 6/1992 | Hirayama | 370/105.4 |
| 5,299,187 | 3/1994 | Tabu et al. | 370/105.2 |

*Primary Examiner*—Douglas W. Olms
*Assistant Examiner*—Russell W. Blum
*Attorney, Agent, or Firm*—Young & Thompson

[57] ABSTRACT

A clock phase signal of each time slot of a TDM signal is stored into a corresponding memory location and a clock phase signal of a subsequent time slot is read from a memory location corresponding to the subsequent time slot for recovering clock pulses. A decoder is synchronized with the clock pulses for decoding an encoded digital signal of each time slot to produce a decoded signal. The error rate of the decoded signal of each time slot is detected and compared with a prescribed value. When the detected error rate is determined to be higher than the prescribed value, the write operation of the memory is disabled to prevent the clock phase signal stored in a memory location corresponding to the decoded signal from being overwritten with a subsequent clock phase signal.

4 Claims, 2 Drawing Sheets

RECEIVER HAVING CLOCK PHASE MEMORY FOR RECEIVING SHORT PREAMBLE TIME SLOTS

BACKGROUND OF THE INVENTION

1. Field of the Invention

The present invention relates generally to time division multiplex (TDM) digital communication systems, and more specifically to a digital receiver for receiving a TDM signal having a short preamble for clock timing recovery.

2. Description of the Related Art

In a conventional TDM communication system, digital signals from different data sources are encoded and sequentially transmitted on respective time slots, or channels. For carrier and clock timing recovery, each time slot contains a preamble. At the receive site, the TDM signal is demodulated into a baseband signal using the portion of the preamble for carrier recovery and the clock phase of each time slot is detected from the portion of the preamble for clock timing recovery. A clock recovery circuit is responsive to the clock phase of each successive time slot for generating clock pulses. By using the clock pulses, the encoded digital signal of each time slot is decoded.

However, since the clock timing of each data source is not necessarily synchronized with the clock timing of the other data sources, the preamble for clock timing recovery is required to be of sufficient length to accommodate such source-to-source clock timing differences. In addition, when noise is introduced in the immediately preceding time slot corrupting its clock phase information, the corrupted phase is used as an initial phase during the subsequent clock generation process. Therefore, the preamble of the conventional TDM communication system must be of sufficient length to ensure against such phase jitter, resulting in low transmission efficiency.

SUMMARY OF THE INVENTION

It is therefore an object of the present invention to enable a TDM communication system to employ a short preamble for clock timing recovery to improve the transmission efficiency of the system.

The present invention is based on the fact that the clock timing of each data source is the same for all the time slots (or channel) of the data source.

This object is obtained by the use of a memory having a plurality of locations for storing the phase data of each time slot and reading it for delivery to a clock recovery circuit during a subsequent time slot, and an error rate evaluation circuit for disabling the write operation upon detection of a signal having a high error rate. Since the phase data read out of each memory location is the same for each channel of the TDM signal, synchronization can be quickly established for clock timing recovery, requiring a short preamble for clock timing recovery.

More specifically, the present invention provides an apparatus for receiving a sequence of time slots each containing a preamble for clock timing recovery and an encoded digital signal. The apparatus comprises a phase detector for detecting a clock phase of the preamble of each of the time slots and deriving therefrom a clock phase signal for each of the time slots, and a memory having a plurality of memory locations corresponding respectively to the time slots. A clock phase signal of a time slot supplied from the phase detector is stored into one of the memory locations corresponding to that time slot so that a previously stored clock phase signal is overwritten with a subsequent clock phase signal, and a clock phase signal of a subsequent time slot is read from one of the memory locations corresponding to the subsequent time slot. Using the clock phase signal read out of the memory, a clock recovery circuit derives clock pulses. A decoder is synchronized with the clock pulses for decoding the encoded digital signal of each time slot and producing a decoded signal. The error rate of the decoded signal of each time slot is detected and compared with a prescribed value. When the detected error rate is determined to be higher than the prescribed value, the write operation of the memory is disabled to prevent the clock phase signal stored in a memory location corresponding to the decoded signal from being overwritten with a subsequent clock phase signal.

BRIEF DESCRIPTION OF THE DRAWINGS

The present invention will be described in further detail with reference to the accompanying drawings, in which.

DETAILED DESCRIPTION

Figure 1:
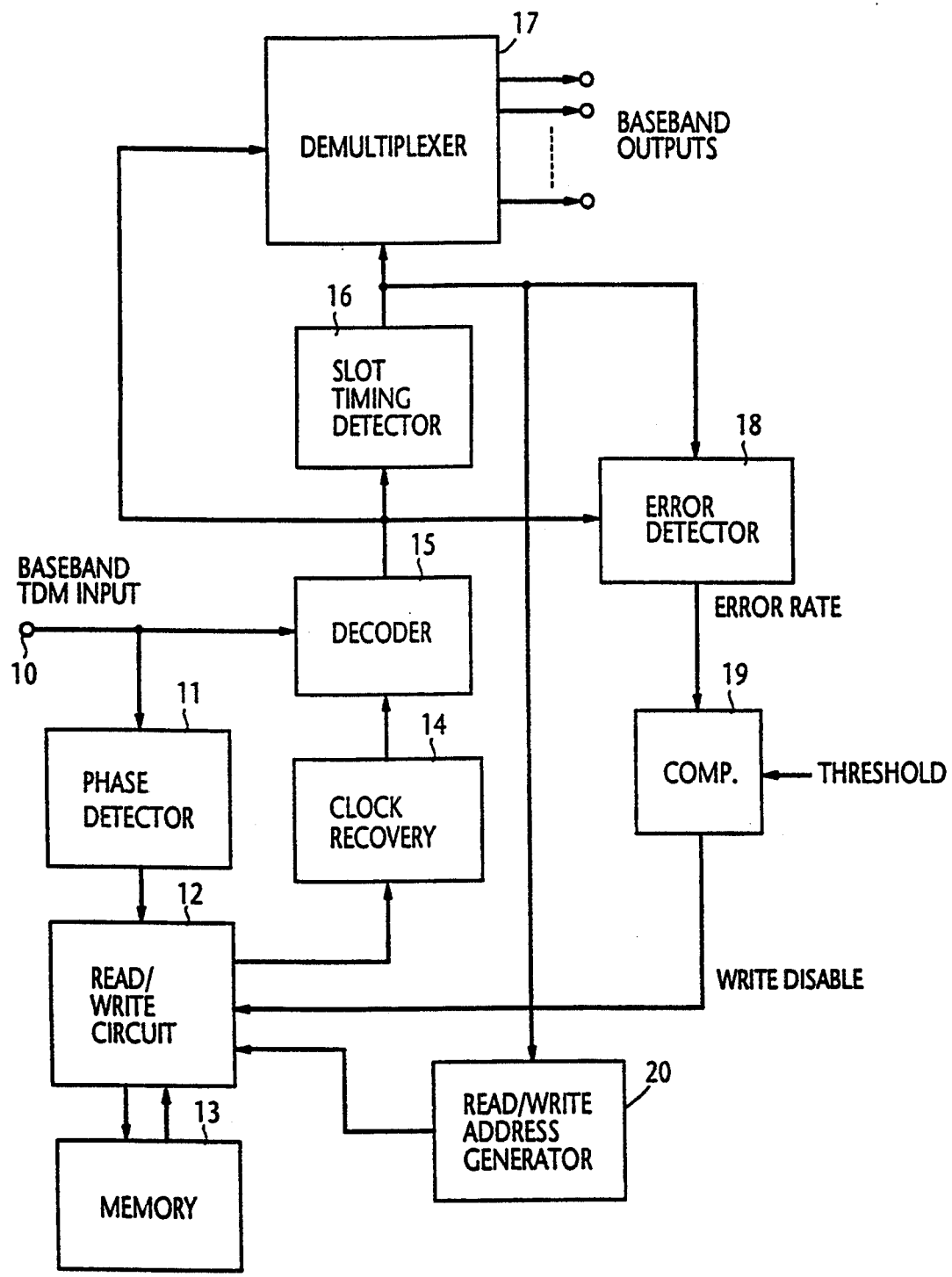
FIG. 1 is a block diagram of a digital receiving apparatus according to an embodiment of the present invention.

Referring now to FIG. 1, there is shown a digital receiving apparatus according to one embodiment of the present invention. The apparatus is adapted to receive a time division multiplex (TDM) signal in which a plurality of channel signals are multiplexed on individual time slots and converted to a baseband TDM signal by a demodulator, not shown. Each time slot of the TDM signal contains encoded data from an individual channel source which is preceded by a preamble for clock timing recovery. The baseband TDM signal is applied through an input terminal 10 to a phase detector 11 for detecting the initial clock phase of the preamble of each multiplexed channel signal to produce a signal representative of the clock phase, which is applied to a read/write control circuit 12. In a manner to be described, read/write control circuit 12 is responsive to the output of a read/write address generator 20 to store the clock phase signal into a memory 13 and read the stored signal out of the memory into a clock recovery circuit 14. Memory 13 has a plurality of storage locations respectively corresponding to the multiplexed channels of the TDM input for storing the clock phase signal of the corresponding channels. Clock recovery circuit 14 derives clock timing pulses for each time slot, or channel, from the clock phase signal read out of the memory 13 via read/write control circuit 12.

The baseband TDM signal is also fed into a decoder 35. By using the clock timing pulses supplied from the clock recovery circuit 14, the decoder 14 performs a decoding operation on the digital data contained in each time slot and supplies the decoded time slot signal to a slot timing detector 16, a demultiplexer 17 and an error detector 18. The slot timing detector 16 derives a timing signal from each time slot of the decoded signal and applies it to the demultiplexer 17 in which the output of decoder 15 is demultiplexed into individual signals. The slot timing signal is also applied to the error detector 18 where it is used to analyze the decoded time slot signal to detect error bits and produce a signal representative of the error rate of each time slot. The error rate signal is compared in a comparator 19 with a threshold. If the error rate is higher than the threshold value, comparator 19 supplies a write disabling signal to the read/write control circuit 12.

Figure 2:
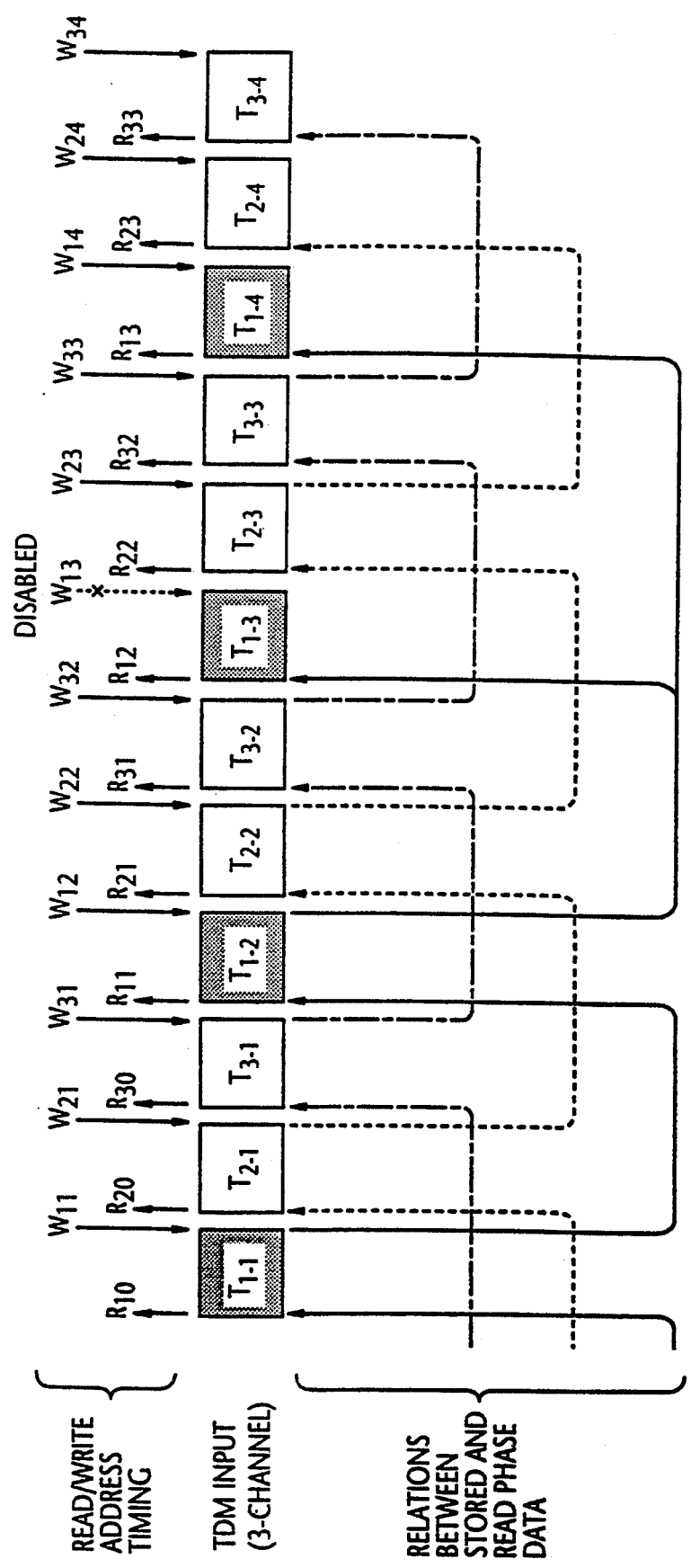
FIG. 2 is a timing sequence illustrating the relationships between stored and read clock phase together with read/write address timing.

In response to the output of slot timing detector 16, the read/write address generator 20 generates read and write address signals as shown in FIG. 2 in which a three-channel TDM input is shown for simplicity. A write address signal $W_{ij}$ (where i and j are the channel identifier and the time-slot sequence number, respectively) is generated at the end of each time slot $T_{i\text{-}j}$ to store the clock phase signal of a time slot $T_{i\text{-}j}$ into the memory location $M_i$ of memory 13, and a read address signal $R_{ij}$ is generated at the beginning of the time slot $T_{i\text{-}j}$ to read out the, clock phase signal of previous time slot $T_{i\text{-}(1\text{-}1)}$ from the memory location $M_i$.

For example, in the absence of write disabling signal from comparator 19, the clock phase signal of time slot $T_{1\text{-}1}$ is written into memory location $M_1$ at the end of this time slot in response to a write address signal $W_{11}$ and read out of this memory location at the beginning of the next time slot $T_{1\text{-}2}$ in response to a read address signal $R_{12}$ and the clock phase signal of time slot $T_{1\text{-}2}$ is written into the same memory location $M_1$ at the end of time slot $T_{1\text{-}2}$ in response to a write address signal $W_{12}$, so that the contents of memory location $M_1$ is overwritten with the latest clock phase signal and read out of this memory location at the beginning of the next time slot $T_{1\text{-}3}$ in response to a read address signal $R_{13}$.

If the next time slot $T_{1\text{-}3}$ is severely affected by noise, it is likely that the clock phase of this slot is also severely affected. The error rate of time slot $T_{1\text{-}3}$ is thus determined by comparator 19 to be higher than the threshold, and a write disabling signal is generated. The read/write control circuit 12 is prevented from responding to a write address signal $W_{13}$ and the clock phase signal of time slot $T_{1\text{-}2}$ is prevented from being overwritten with the clock phase signal of time slot $T_{1\text{-}3}$. Therefore, in response to a read address signal $R_{14}$ the clock phase signal of time slot $T_{1\text{-}2}$ is retrieved again from memory location $M_1$ at the beginning of the next time slot $T_{1\text{-}4}$ and supplied to the clock recovery circuit 14 for generating clock pulses for time slot $T_{1\text{-}4}$.

Since the clock timing of each data source is the same for all time slots of the data source, constant phase data is read out of each memory location. Thus, synchronization can be quickly established in the clock recovery circuit 14, and hence, the present invention requires a short preamble for clock timing recovery. Additionally, if time slot $T_{1\text{-}3}$ is affected by noise, the read/write controller 12 prevents the phase information of this time slot from overwriting the phase information obtained from the previous time slot $T_{1\text{-}2}$ so that phase information not affected by noise can be used for clock recovery during the subsequent time slot $T_{1\text{-}4}$.

What is claimed is:

1. An apparatus for receiving a sequence of time slots each containing a preamble for clock timing recovery and an encoded digital signal, comprising:
   a phase detector for detecting a clock phase of the preamble of each of said time slots and deriving therefrom a clock phase signal for each of the time slots;
   memory means having a plurality of memory locations corresponding respectively to said time slots;
   memory control means for writing a clock phase signal of a time slot from said phase detector into one of the memory locations corresponding to the time slot so that a previously stored clock phase signal is overwritten with a subsequent clock phase signal, and reading a clock phase signal of a subsequent time slot from one of the memory locations corresponding to the subsequent time slot;
   clock recovery means for deriving clock pulses from the clock phase signal read out of said memory means;
   a decoder synchronized with said clock pulses for decoding the encoded digital signal of each time slot and producing a decoded signal; and
   detector means for detecting an error rate of the decoded signal and preventing said memory control means from writing a clock phase signal when the detected error rate is higher than a prescribed value.

2. An apparatus as claimed in claim 1, wherein said memory control means Includes means for writing said clock phase signal at the end of the time slot of the clock phase signal and reading the clock phase signal of the subsequent time slot at the beginning of the subsequent time slot.

3. In an apparatus for receiving a sequence of time slots each containing a preamble for clock timing recovery and an encoded digital signal, said apparatus including a memory having a plurality of memory locations corresponding respectively to said time slot, a method comprising:
   a) detecting a clock phase of the preamble of each of said time slots and deriving therefrom a clock phase signal for each of the time slots;
   b) writing a clock phase signal detected by the step (a) into one of the memory locations corresponding to the time slot of the clock phase signal so that a previously stored clock phase signal is overwritten with a subsequent clock phase signal;
   c) reading a clock phase signal of a subsequent time slot from one of the memory locations corresponding to the subsequent time slot;
   d) deriving clock pulses from the clock phase signal read out of said memory;
   e) decoding the encoded digital signal of each time slot synchronously with said clock pulses and producing a decoded signal;
   f) detecting an error rate of the decoded signal and determining whether the detected error rate is higher or lower than a prescribed value; and
   g) if said error rate is determined to be lower than said prescribed value, repeating the steps (b) to (f), and if said error rate is determined to be higher than said prescribed value, repeating the steps (c) to (f).

4. A method as claimed in claim 3, wherein the step (b) includes writing said clock phase signal at the end of the time slot of the clock phase signal and the step (c) includes reading the clock phase signal of the subsequent time slot at the beginning of the subsequent time slot.

* * * * *